C. HAMMER.

FRICTION CLOSURE FOR CONTAINERS.

APPLICATION FILED FEB. 28, 1921.

Reissued Jan. 3, 1922. 15,259.

Inventor
Charles Hammer
By his Attorney
Wm. H. Reid.

UNITED STATES PATENT OFFICE.

CHARLES HAMMER, OF QUEENS, NEW YORK, ASSIGNOR TO AMERICAN METAL CAP COMPANY, OF BROOKLYN, NEW YORK, A CORPORATION OF NEW YORK.

FRICTION CLOSURE FOR CONTAINERS.

15,259. Specification of Reissued Letters Patent. Reissued Jan. 3, 1922.

Original No. 1,335,054, dated March 30, 1920, Serial No. 245,300, filed July 17, 1918. Application for reissue filed February 28, 1921. Serial No. 448,591.

*To all whom it may concern:*

Be it known that I, CHARLES HAMMER, a citizen of the United States, and resident of Queens, county of Queens, State of New York, have invented certain new and useful Improvements in Friction Closures for Containers, of which the following is a specification.

This invention relates to caps or closures that are applied to containers, such as jars or bottles, particularly those containers which have a straight outer sealing wall, and do not depend upon screw threads or grooves to hold the cap on the container.

The object of the present invention is to provide an improved form of closure of this character adapted to be loosely placed on the container and secured thereon by a mere application of downward pressure on top of the container, especially at the outer portion thereof; and which container will provide a secure sealing surface for engagement with the outer wall of the container; and which closure will receive a sealing gasket and retain it inside of the closure until applied to the container, and which will further form a kind of wedge shape to the gasket that converges downwardly, on application of the closure.

In the accompanying drawing showing embodiments of my invention, Fig. 1 is a vertical section through a portion of a container and closure, as the cap is first applied to the jar.

Figure 1:
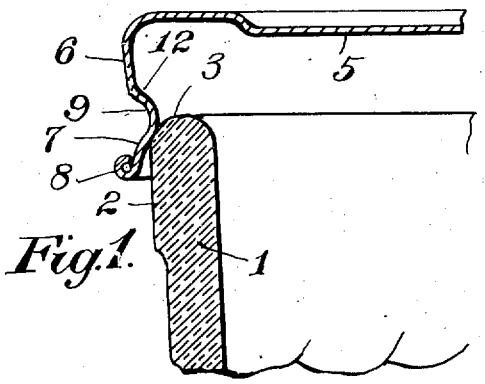

The closure is shown as comprising a top member 5, having a flange 6 extending downwardly therefrom, which flange is conically inclined downwardly and inwardly. The flange portion 6 connects with the top 5 by a flat portion 4 at the outer part of the top, that extends in a horizontal plane, as shown. The conical portion 6, at its connection with the flat top may be given a small curve, as shown in the several views.

The lower portion of the flange extends downwardly and outwardly, as indicated at 7; and if desired, the raw edge may be bent to form a closed bead 8. This flaring end portion adapts the closure, when placed on top of the container or jar 1, to engage the outer portion of its rounded upper edge 3. The jar is shown as provided with a substantially straight or cylindrical outer wall 2.

The lower flaring portion 7 is shown as connected with the upper conical inwardly inclined portion 6, by a portion 9 that extends inwardly from the lower part of the conical portion 6, whereby is formed on the inner wall of the flange a shoulder indicated by 12. As shown this connecting portion 9 is curved between the conical portion 6 and the flaring portion 7, which curve is convex on the inner wall of the flange. This annular convex portion constitutes the engaging part of the closure engaging with the top of the jar, as shown in Figs. 1 and 3, and by reason of its arch construction, tends to resist undue bending of the closure when pressure is applied vertically downward to seal the jar; as this movement will necessarily enlarge the diameter of the flange at this portion; the normal internal diameter of the closure being slightly less than the outer diameter of the container at the straight outer wall 2.

Figure 2:
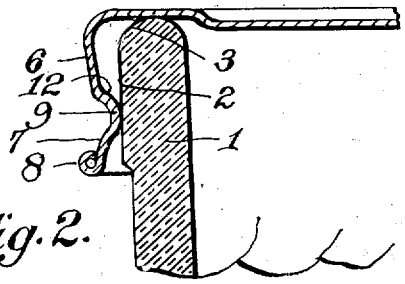
Fig. 2 is a similar view showing the closure forced down on the container.

The ledge 12 acts to receive a sealing gasket 10, of suitable composition that will admit of compression, to conform to the shape of the chamber constituted by the flange and top of the closure, and the outer and upper wall of the container, see Fig. 2. This gasket is inserted in the container, and is preferably shaped as shown with the lateral thickness less than the height, and is adapted to engage the top straight wall 4 of the container, and rest on the ledge 12, as shown in Fig. 3; which will serve to securely retain the gasket in the closure before application to the jar.

Figure 3:
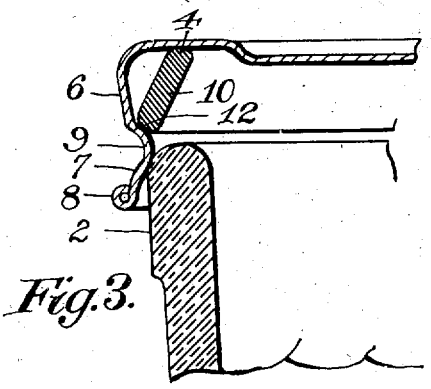
Fig. 3 is a view similar to Fig. 1 showing the sealing gasket or ring.
Figure 4:
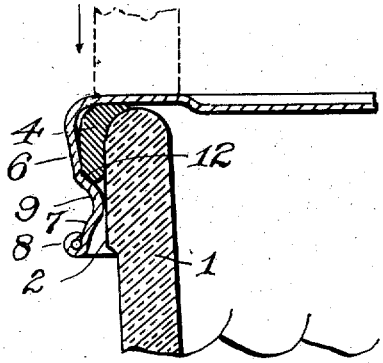
Fig. 4 shows the latter forced down on the container.
Figure 5:
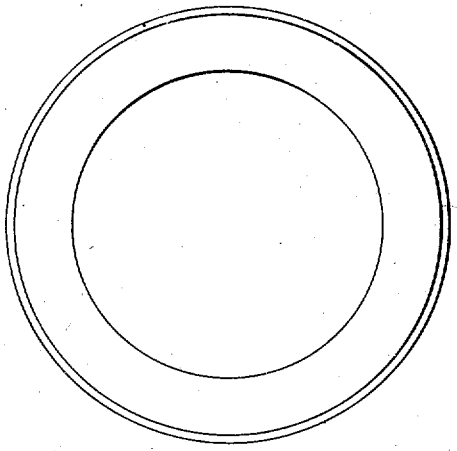
Fig. 5 is a partial plan view of the closure.

In the use of this closure, it is placed loosely on top of the jar as indicated in Fig. 3, with the gasket inserted; or as in Fig. 1, with the gasket omitted. Pressure is thereupon exerted downwardly on top of the cap, at the outer flat portion 4, by any suitable device, and the closure will be forced down on the jar. The convex portion 9 engaging the top rounded edge of the jar at its outer part, will be forced slightly outward, and will then pass down the cylindrical wall 2 of the jar, as shown in Fig. 4. As the closure is forced downward, the inner wall of the gasket 10 will engage the upper edge of the jar, that will force the gasket outward and cause it to be received in the wedge-shaped chamber between the conical flange portion 6 and the jar wall. The horizontal width of the gasket is preferably slightly more than this wedge-shaped chamber at its lower portion, to insure the compression of the gasket; and this will cause the upper portion of the gasket to expand slightly and fill the space between the top and conical wall of the closure, and the outer and top wall of the container, as clearly shown in Fig. 4. The slight expansion of the closure at the part 9, will follow any irregularities in the jar wall and size, and it will securely grip the jar; at the same time the flexible gasket will completely fill the chamber between the jar wall and the closure, and form a hermetic seal.

What I claim is:—

1. A closure of rigid sheet metal comprising a top and a flange, the flange being conically inclined inwardly, and then extending inwardly from the lower end of the conical portion to form a ledge or shoulder on the inner wall of the flange, the lower edge of the flange extending outwardly and downwardly.

2. A closure of rigid sheet metal comprising a top and a flange, the top at the outer part lying in a plane, the flange being conically inclined inwardly from said top portion, and then extending inwardly from the lower end of the conical portion to form a ledge or shoulder on the inner wall of the flange.

3. A closure of rigid sheet metal comprising a top and a flange, the top at the outer part lying in a plane, the flange being conically inclined inwardly from said top portion, and then extending inwardly from the lower end of the conical portion to form a ledge or shoulder on the inner wall of the flange, the lower edge of the flange extending outwardly and downwardly.

4. A closure of rigid sheet metal comprising a top and a flange, the flange being conically inclined inwardly, and then extending inwardly from the lower end of the conical portion to form a ledge or shoulder on the inner wall of the flange, the lower edge of the flange extending outwardly and downwardly, said ledge and lower portion forming a curve convex on the inner wall of the flange.

5. A closure of rigid sheet metal comprising a top and a flange, the top at the outer part lying in a plane, the flange being conically inclined inwardly from said top portion, and then extending inwardly from the lower end of the conical portion to form a ledge or shoulder on the inner wall of the flange, the lower edge of the flange extending outwardly and downwardly, said ledge and lower portion forming a curve convex on the inner wall of the flange.

6. A closure comprising a top and a flange, the flange being conically inclined inwardly, and then extending inwardly from the lower end of the conical portion to form a ledge or shoulder on the inner wall of the flange; the lower edge of the flange extending outwardly and downwardly, and a ring gasket in the closure with the lower edge resting on said ledge and extending to engage the top wall of the closure.

7. A closure comprising a top and a flange, the top at the outer portion lying in a plane, the flange being conically inclined inwardly from said top portion, and then extending inwardly from the lower end of the conical portion to form a ledge or shoulder on the inner wall of the flange, and a ring gasket in the closure with the lower edge resting on said ledge and extending up to engage the top wall of the closure.

8. A closure comprising a top and a flange, the top at the outer part lying in a plane, the flange being conically inclined inwardly from said top portion and then extending inwardly from the lower end of the conical portion to form a ledge or shoulder on the inner wall of the flange, the lower edge of the flange extending outwardly and downwardly, and a ring gasket in the closure with the lower edge resting on said ledge and extending up to engage the top wall of the closure.

9. A closure comprising a top and a flange, the flange being conically inclined inwardly, and then extending inwardly from the lower end of the conical portion to form a ledge or shoulder on the inner wall of the flange, the lower edge of the flange extending outwardly and downwardly, said ledge and lower portion forming a curve convex on the inner wall of the flange, and a ring gasket in the closure with the lower edge resting on said ledge and extending up to engage the top wall of the closure.

10. The combination with a container having a straight outer wall at the top and a rounded top edge, of a closure having a top flat at the outer part, and a flange conically inclined inwardly from said top portion, and then extending inwardly from the conical portion to form a ledge on the inner wall, whereby to form with said jar outer wall an annular wedge-shaped chamber diverging upwardly, and a sealing gasket compressed in said chamber between the jar wall and the side and top walls of the container.

11. The combination with a container having a straight outer wall at the top and a rounded top edge, of a closure having a flange conically inclined inwardly and then extending inwardly from the conical portion to form a ledge on the inner wall, with the lower edge portion extending outwardly and downwardly, whereby to form with said jar outer wall an annular wedge-shaped chamber diverging upwardly, and a sealing gasket compressed in said chamber between the jar wall and the side and top walls of the container.

12. The combination with a container having a straight outer wall at the top and a rounded top edge, of a closure having a top flat at the outer part, and a flange conically inclined inwardly from said top portion, and then extending inwardly from the conical portion to form a ledge on the inner wall, with the lower edge portion extending outwardly and downwardly, whereby to form with said jar outer wall an annular wedge-shaped chamber diverging upwardly, and a sealing gasket compressed in the chamber between the jar wall and the side and top walls of the container.

13. A friction closure comprising a top having an annular flange formed with an inward incline, an outward incline below the inward incline and an inward curve connecting the inward and outward inclines.

14. A friction closure comprising a top having an annular flange formed with a substantially straight inward incline, a slightly curved outward incline, and an inward curve on a considerable arc connecting the inward and outward inclines.

15. A friction closure comprising a top having an annular flange formed with a substantially straight inward incline, a slightly curved outward incline, and an inward curve on a considerable arc connecting the inward and outward inclines, there being a bead on the lower edge of the outward incline and a depression in said top.

16. The combination of a jar having a substantially straight outer wall with a downwardly and outwardly inclined portion at the upper end thereof, of a cap having an annular flange formed with an inward incline, an outward incline below the inward incline, and an inward curve connecting said inclines, the proportions of such jar and cap being such that the downward and outward incline of the jar engages the juncture of the outward incline and the inward curve when the cap is applied loosely to the jar.

17. A closure of rigid sheet metal comprising a top having an annular flange formed with an inward incline, and an inward curve below said inward incline.

18. A closure comprising a top having an annular flange formed with an inward incline, an inward curve below said incline, and a sealing ring arranged at an angle to the perpendicular and bearing on said curve at its lower edge.

19. A closure comprising a top having a flange formed with a straight inward incline, an outward incline therebelow, an inward curve between said inclines and a sealing ring bearing at its lower end against said curve and at its upper end extending inwardly at an incline to a contact with said top.

CHARLES HAMMER.